Figure 1:
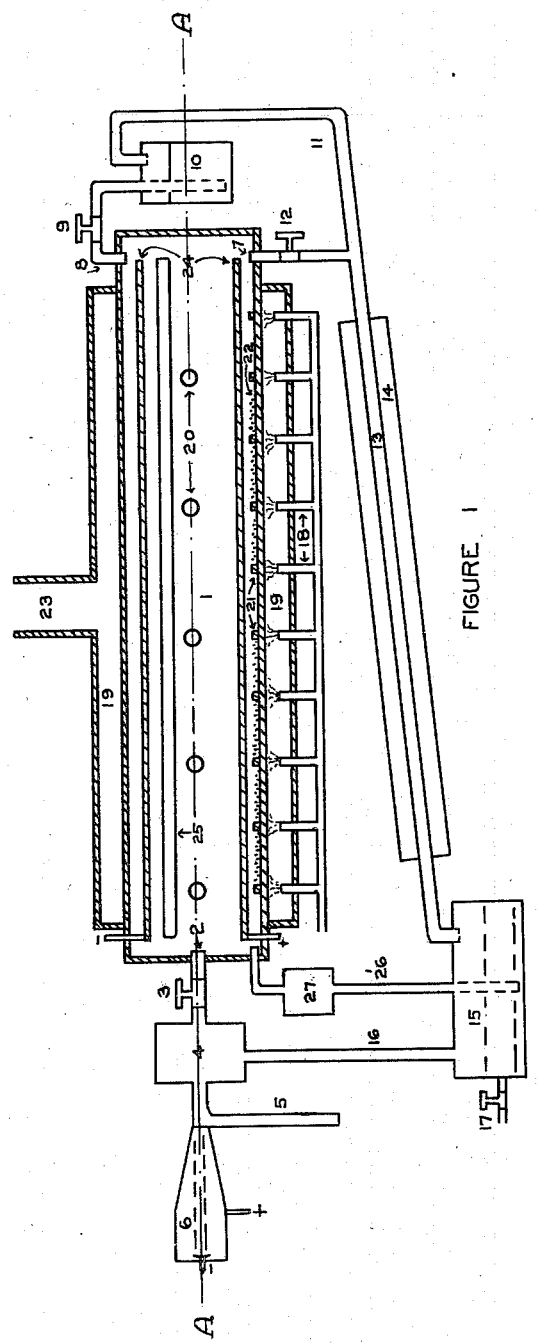
Figure 2:
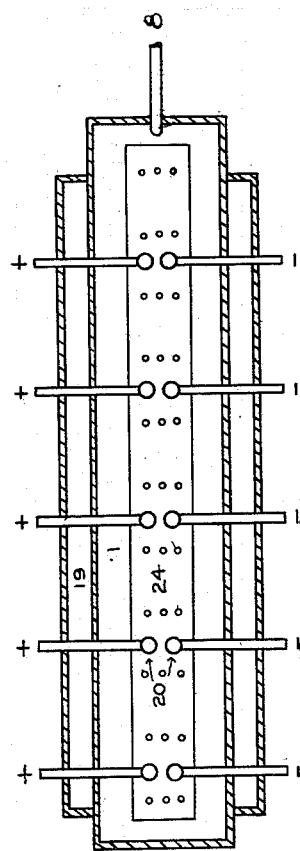

June 5, 1934.　　　　D. M. HILLIS　　　　1,961,493

PROCESS AND APPARATUS FOR TREATING HYDROCARBONS

Original Filed Aug. 11, 1930

INVENTOR
Doniel Marshall Hillis

Patented June 5, 1934

1,961,493

UNITED STATES PATENT OFFICE 1,961,493

PROCESS AND APPARATUS FOR TREATING HYDROCARBONS

Donuil Marshall Hillis, Los Angeles, Calif.

Application August 11, 1930, Serial No. 474,620
Renewed November 2, 1933

5 Claims. (Cl. 204—31)

This process is primarily for the purpose of changing petroleum gas to liquid fuels similar to benzine, gasoline and kerosene, which can replace these mixtures as fuels or solvents.

By removing one atom of hydrogen from each of two molecules of methane and then by uniting these two molecules, each of which then consists of one atom of carbon and three atoms of hydrogen, a molecule of ethane is produced, consisting of two atoms of carbon and six of hydrogen.

By removing one atom of hydrogen from the ethane and one atom of hydrogen from another molecule of methane, these two molecules can unite to form a molecule of propane. Repetition of the same procedure with a molecule of propane and a molecule of methane yields butane. This process can be carried further to yield pentane, hexane, heptane and octane, the main constituents of gasoline.

Altho the above description outlines the normal sequence of the steps in this synthesis, it is conceivable that two hydrogen atoms may be removed from a methane molecule at the same time. The remaining part of the molecule can then unite with two molecules of methane, each of which has lost a hydrogen atom. Still other variations of the synthesis suggest themselves and the claim in this specification is intended to include all the variations that can be accomplished in the process described in the following pages.

Figure "1" is a profile of the machine. Figure "2" is a plan view which is merely for the purpose of illustrating the arrangement of the electrodes "20" which is not well shown by the profile.

In order to separate hydrogen atoms from methane, which is the first step in the process, a stream of gas containing a large proportion of this hydrocarbon is introduced to the cylindrical chamber "1" thru the pipe "5" at the extreme left. To reach "1" it passes thru a compressor and storage tank unit "4" which is only shown figuratively, thru a valve "3" which controls the amount of the flow and finally thru the orifice "2" into the chamber "1".

In making this passage it has been subjected to a cathode ray plus an X-ray, the first a stream of electrons at high speed which actually come thru the thin wall or window at the end of the vacuum tube "6" into the pipe "5", and the second a result of the collisions of the electrons with the glass walls.

This shower of electrons moving at speeds between 30,000 miles and 100,000 miles per second, is directed against the incoming stream of gas for the purpose of partly effecting the separation of the hydrogen atoms from the hydrocarbon molecules and for the purpose of ionizing the gas.

In the chamber "1" the gas is subjected to further treatment by exposure to light from a mercury arc lamp "25", to heat from a series of gas burners "18", to the effect of mercury vapor which has been ionized to an excited state by the light from the mercury lamp. This mercury vapor is obtained by placing mercury in the bottom of the cylindrical chamber "1" and subjecting it to heat from the burners "18". Besides this the stream of hydrocarbon gas is subjected to the effect of some sparking electrodes, to the effect of hot powdered nickel and finally to the effect of an electric field produced by potential maintained on the plates "24".

The reason for subjecting the hydrocarbon gas to the mercury vapor and to the mercury arc lamp is to highly ionize it. The light from the mercury arc lamp acts on the free mercury vapor in the chamber "1" to place it in a highly ionized state and some of the energy of this state is then transferred to the hydrocarbon gas molecules.

The reason for subjecting it to the sparking arcs is to bombard the excited atoms of the hydrocarbon gas with rapidly moving electrons for the purpose of tearing some of the hydrogen atoms loose from the molecules.

The purpose of the powdered nickel is to assist in the removal of hydrogen from methane. This takes place at higher temperatures.

The purpose of the electrodes "24" and the electric field they produce, is to cause a separation of the free hydrogen from the molecules of hydrocarbons that have been separated from part of their hydrogen. These two would tend to re-unite but by the use of an electric field they may be separated. The hydrogen atoms will drift toward the negative electrode while the hydrocarbon molecules which have been robbed of hydrogen atoms will drift toward the positive electrode.

In Figure "1" at the extreme right is an orifice "8" thru which the hydrogen passes to the vessel "10" which contains an oxidizing agent that removes the hydrogen. In the gas that passes thru "10", there will still be some unaltered methane and possibly some partly altered methane and other members of this series. This mixture less the hydrogen is then returned to the system thru the pipe "11".

Also at the exrteme right hand side of Figure "1" is the orifice "7" thru which flows the hydrocarbons that have been robbed of their hydrogen. This portion of the gas flowing thru "1"

tends to collect on the bottom for two reasons; it is heavier and it is attracted to the positive electrode, while the portion containing most of the hydrogen goes to the top, being attracted by the negative electrode and being lighter.

In order that the powdered nickel "22" may act upon the gases, the lower electrode "24" is checkerboarded with holes which permit the migration of the gas thru it to the powdered nickel below.

After passing thru the orifice "7" the gas goes into the pipe "13" around which is a waterjacket "14" to condense the part of the product that has turned to a liquid state. The latter flows into the receptacle "15" and does also the condensed mercury which is carried from the chamber "1" to the condenser.

The valve "17" in the vessel "15" permits the removal of the finished product. The portion of the gas which has not been changed to the finished product, is returned to the system thru the pipe "16". From this pipe it passes into the compressor "4" and then returns to "1" via the valve "3" and the orifice "2". In passing thru the system again the unchanged gas is again acted upon by the cathode ray, the arrangement being such that the ray passes thru the tube "5" far enough to affect the gas being returned to "4".

The condensed mercury is returned to the system by means of the pipe "26" and a small pump "27".

As the gases leave the chamber "1", control of the relative amounts flowing thru the orifices "7" and "8", is obtained by two valves "9" and "12".

To properly distribute and conserve the heat produced by the burners "18", it is necessary to surround the chamber "1" by a cylindrical sleeve "19" of slightly larger diameter.

To prevent the nickel powder "22" from being blown away and all piles at the right hand side of the cylinder by the flow of the gases from left to right, little metal ridges "21" have been provided. The smokestack "23" is for the discharge of the gases produced by combustion in the burners "18".

I claim:

1. The process of synthesizing hydrocarbons wherein gaseous hydrocarbons of the aliphatic series are treated with cathode and X-rays and the thus treated material is passed into a reaction zone between oppositely charged electrodes where it is mixed with mercury vapor under heat and pressure and subjected to an arc discharge in the presence of ultraviolet light, the reaction in the reaction zone being in the presence of powdered nickel whereby hydrogen is removed from simpler molecules and complex molecules with more carbon atoms are formed.

2. The process of synthesizing hydrocarbons wherein gaseous hydrocarbons of the aliphatic series are treated with cathode and X-rays and the thus treated material is passed into a reaction zone where it is mixed with mercury vapor under heat and pressure and subjected to an arc discharge in the presence of ultraviolet light, the reaction in the reaction zone being in the presence of powdered nickel whereby hydrogen is removed from simpler molecules and more complex molecules with more carbon atoms are formed, this being facilitated by the subjection of the dissociation products in the reaction zone to a stationary electric field between oppositely charged electrodes, to segregate the dissociated hydrogen atoms from the hydrocarbons in order to effect more rapid polymerization of the latter.

3. In apparatus for the purpose of changing hydrocarbons into other hydrocarbons with more carbon atoms per molecule, the combination of a conduit for the entrance of the hydrocarbons with means to subject the latter to cathode radiation, a reaction chamber containing powdered nickel and a supply of mercury, with means therein for emitting ultraviolet light, means for heating the gases, and oppositely charged electrodes so arranged that their electric field will cause the dissociated hydrogen atoms to migrate toward one exit conduit while the hydrocarbons migrate toward the other, and means to condense the hydrocarbons and mercury vapor and to return the latter and the unaltered hydrocarbons to the reaction chamber and means to dispose of the dissociated hydrogen.

4. The process of synthesizing hydrocarbons wherein gaseous hydrocarbons of the aliphatic series are treated with cathode and X-rays and the thus treated material is passed into a reaction zone where it is mixed with mercury vapor under heat and pressure and subjected to an arc discharge in the presence of ultraviolet light, whereby hydrogen is removed from simpler molecules and more complex molecules with more carbon atoms are formed, this being facilitated by the subjection of the dissociation products in the reaction zone to a stationary electric field between oppositely charged electrodes, to segregate the dissociated hydrogen atoms from the hydrocarbons in order to effect more rapid polymerization of the latter.

5. In apparatus for the purpose of changing hydrocarbons into other hydrocarbons with more carbon atoms per molecule, the combination of a conduit for the entrance of the hydrocarbons with means to subject the latter to cathode radiation, a reaction chamber with a supply of mercury and a source of ultraviolet light, means for heating the gases, means for producing arc discharges thru the gases, and oppositely charged electrodes so arranged that their electric field will cause the dissociated hydrogen atoms to migrate toward one exit conduit while the hydrocarbons migrate toward the other, and means to condense the hydrocarbons and mercury vapor and to return the latter and the unaltered hydrocarbons to the reaction chamber and means to dispose of the dissociated hydrogen.

DONUIL MARSHALL HILLIS.